United States Patent
Yamanaka et al.

(10) Patent No.: US 6,530,229 B2
(45) Date of Patent: Mar. 11, 2003

(54) GAS TURBINE HAVING A COOLING AIR SYSTEM AND A SPRAY AIR SYSTEM

(75) Inventors: Kazunori Yamanaka, Hitachi (JP); Satoshi Kondou, Hitachinaka (JP); Masami Noda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/107,400

(22) Filed: Mar. 28, 2002

(65) Prior Publication Data

US 2002/0095940 A1 Jul. 25, 2002

Related U.S. Application Data

(63) Continuation of application No. 09/643,751, filed on Aug. 23, 2000, now Pat. No. 6,393,826.

(30) Foreign Application Priority Data

Feb. 25, 2000 (JP) .......................... 2000-54379

(51) Int. Cl.$^7$ ................ F02C 6/08; F02C 7/18
(52) U.S. Cl. .................. 60/778; 60/782; 60/806
(58) Field of Search ................ 60/39.141, 39.142, 60/726, 728, 782, 806, 785, 786, 778

(56) References Cited

U.S. PATENT DOCUMENTS

| | | | |
|---|---|---|---|
| 3,901,026 A | | 8/1975 | Quinn |
| 3,971,210 A | * | 7/1976 | Rose ........................... 60/788 |
| 4,375,745 A | * | 3/1983 | Schelp ......................... 60/726 |
| 4,767,259 A | | 8/1988 | Kurosawa et al. |
| 5,054,996 A | | 10/1991 | Carreno |
| 5,063,963 A | | 11/1991 | Smith |
| 5,185,997 A | | 2/1993 | Nishijima |
| 5,782,076 A | | 7/1998 | Huber et al. |
| 5,992,139 A | | 11/1999 | Kesseli |
| 6,050,080 A | | 7/2000 | Horner |
| 6,145,294 A | * | 11/2000 | Traver et al. ............ 60/39.094 |
| 6,393,826 B1 | * | 5/2002 | Yamanaka et al. ............ 60/726 |

FOREIGN PATENT DOCUMENTS

JP 4-214931 8/1992

* cited by examiner

*Primary Examiner*—Ted Kim
(74) *Attorney, Agent, or Firm*—Mattingly, Stanger & Malur, P.C.

(57) ABSTRACT

A gas turbine has a cooling air system supplying air for cooling a high temperature part of the gas turbine and a spray air system supplying air for spraying fuel into a combustor and is formed so that a part of high-pressure air compressed by a gas turbine compressor is used as air of the cooling air system and spray air system, wherein a heat exchanger and a boost compressor are arranged downstream of the outlet of compressed air of the gas turbine compressor, and the boost compressor is composed of a parallel connection of a compressor driven by the turbine shaft and ae compressor driven by a driven source other than the turbine shaft, and pressurized air from the boost compressor is used as air for the cooling air system and the spray air system.

7 Claims, 3 Drawing Sheets

GAS TURBINE HAVING A COOLING AIR SYSTEM AND A SPRAY AIR SYSTEM

This is a continuation application of U.S. Ser. No. 09/643,751, filed Aug. 23, 2000, now U.S. Pat. No. 6,393,826.

BACKGROUND OF THE INVENTION

The present invention relates to a gas turbine and more particularly to a gas turbine formed so that a part of high-pressure air compressed by a gas turbine compressor is used as air for a cooling air system and a spray air system.

As countermeasures for a recent increase in demands of power and global warming, realization of large capacity and high efficiency of gas turbine power generating equipment is required. Particularly, in gas turbine power generating equipment leading air compressed by a compressor to a combustor, supplying fuel to burn it with the air, and driving the gas turbine by its combustion gas, large capacity and high efficiency can be realized by increasing the combustion temperature more.

However, in a heat recovery type gas turbine, that is, a gas turbine for recovering energy held by higher-temperature combustion gas, there is the possibility that damage may be caused to parts exposed at a high temperature without cooling and developed to a serious accident. Therefore, in gas turbine power generating equipment in which a combustion gas temperature is high, the high-temperature part of the gas turbine is cooled using compressed air or vapor as a cooling medium.

On the other hand, when oil such as light oil is to be used as fuel, spray air for spraying fuel into a combustor is necessary. A conventional spray air system adjusts the air temperature by a heat exchanger using a part of air discharged from a compressor, pressurizes it by the compressor to air of higher pressure than air for combustion, produces clean air by letting it pass through a filter so as to prevent the fuel nozzle from clogging, then supplies air to the combustor and uses it to spray fuel.

A conventional cooling air system supplies air extracted by the compressor to the high-temperature part of the turbine directly or after it passes through the heat exchanger for temperature adjustment. In this case, in a gas turbine which uses a part of air discharged from the compressor for cooling the turbine blades so as to improve the turbine efficiency and then recovers it into the combustor, a heat exchanger for keeping cooling air at an appropriate temperature and a filter and a mist separator for making cooling air more clean are installed.

A system constitution for cooling air discharged from the compressor by the heat exchanger, cooling the high-temperature part of the turbine, and also using it as fuel spray air, is disclosed, for example, in Japanese Patent Application Laid-Open 4-214931 and its equivalent, Nishijima U.S. Pat. No. 5,185,997.

In a gas turbine formed as mentioned above, that is, a gas turbine having a fuel oil spray air system and a cooling air system in common and formed so that a boost compressor is driven by the turbine shaft from the viewpoint of reliability of cooling air supply, the number of revolutions of the turbine at start is small, so that the discharge pressure of the boost compressor is insufficient and hence at start, an air system for compensating for it is necessary.

SUMMARY OF THE INVENTION

The present invention was developed in view of the foregoing and is to provide a gas turbine which sufficiently supplies, even at start, high-pressure air to a fuel oil spray air system and a cooling air system.

Namely, the present invention is intended to accomplish the expected object in a gas turbine which has a cooling air system supplying air for cooling the high-temperature part of the gas turbine and a spray air system supplying air for spraying fuel into a combustor and is formed so that a part of high-pressure air compressed by a gas turbine compressor is used as air for the cooling air system and spray air system, and in which a heat exchanger and a boost compressor are arranged downstream of the outlet side of compressed air of the gas turbine compressor, the boost compressor is constructed by a parallel connection of a compressor driven by the turbine shaft and a compressor driven by a drive source other than the turbine shaft, and pressurized air from the boost compressor is used as air for the cooling air system and the spray air system.

Furthermore, the present invention is intended, in a gas turbine which has a cooling air system supplying air for cooling the high-temperature part of the gas turbine and a spray air system supplying air for spraying fuel into a combustor and is formed so that a part of high-pressure air compressed by a gas turbine compressor is used as air for the cooling air system and spray air system, in which a heat exchanger and a boost compressor are arranged downstream of the outlet side of compressed air of the gas turbine compressor, the boost compressor is constructed by a parallel connection of a compressor driven by the turbine shaft and a compressor which is driven by a drive source other than the turbine shaft and operated when the gas turbine is started, and pressurized air from the boost compressor is used as air for the cooling air system and the spray air system.

In this case, between the compressor driven by the turbine shaft and the compressor driven by a drive source other than the turbine shaft, a switching means for switching to the spray air system is installed. On the output side of high-pressure air of the compressor driven by the turbine shaft and the compressor driven by a drive source other than the turbine shaft, a check valve is installed. In the spray air system on the output side of high-pressure air of the boost compressor, a heat exchanger for cooling spray air is installed. On the output side of high-pressure air of the boost compressor, a pressure adjustment device adjusting the outlet pressure is installed. The compressor driven by a drive source other than the turbine shaft is a compressor driven by a motor or a compressor driven by an internal combustion engine.

Namely, in a gas turbine formed as mentioned above, a heat exchanger and a boost compressor are arranged on the downstream side on the outlet side of compressed air of the gas turbine compressor, and the boost compressor is constructed by a parallel connection of a compressor driven by the turbine shaft and a compressor driven by a drive source other than the turbine shaft, and pressurized air from the boost compressor is used as air for the cooling air system and the spray air system, so that at start, the boost compressor driven by a drive source other than the turbine shaft is operated, and fuel oil spray air and cooling air are supplied, and hence even at start, appropriate high-pressure air can be supplied to the fuel oil spray system and cooling system.

DESCRIPTION OF THE EMBODIMENTS OF THE INVENTION

Figure 1:
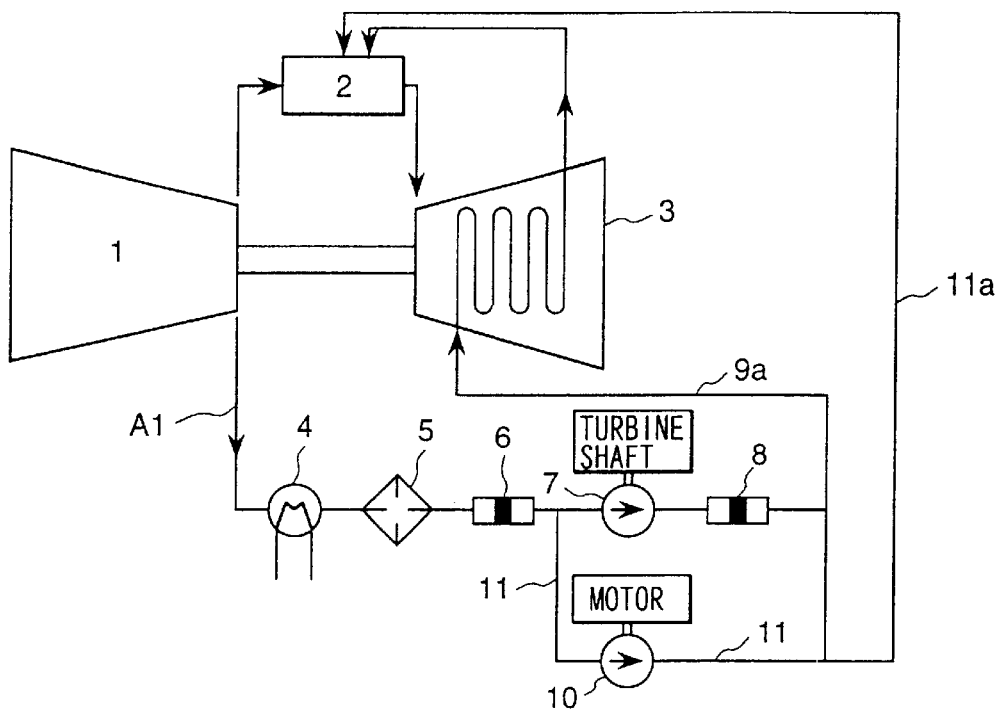
FIG. 1 is a schematic view showing an embodiment of a gas turbine of the present invention.

The present invention will be explained in detail hereunder on the basis of the embodiments shown in the accompanying drawings. In FIG. 1, a gas turbine system of an embodiment of the present invention is shown. Numeral 1 indicates a compressor, 2 a combustor, 3 turbine, 7 a first boost compressor driven by the turbine shaft, 10 a second boost compressor driven by a motor or an internal-combustion engine, that is, which is a drive source other than the turbine shaft (an example of a case of a boost compressor driven by the motor will be explained hereunder), 9a a high-temperature part cooling air system, and 11a a fuel oil spray air system.

Compressed air A1 on one side branched from the outlet of the gas turbine compressor 1 is cooled to an appropriate temperature by a heat exchanger 4 and then led to a mist separator 5, in which mist in the air is separated. Compressed air on the other side is directed to a line led to the combustor 2. The compressed air A1, thereafter, is led to a filter 6 from the mist separator 5 and foreign substances such as dust included in compressed air are removed. Thereafter, the compressed air is pressurized by the boost compressor 7 up to optimum pressure as fuel oil spray air and cooling air.

Also on the downstream side of the boost compressor 7 driven by the turbine shaft, a filter 8 is installed, and air to be supplied to the combustor 2 and the turbine 3 is made clean finally. A part of the compressed air adjusted to an appropriate temperature and pressure as fuel oil spray air and cooling air is supplied to the combustor 2 via the system 11a as fuel oil spray air supplied from the fuel oil system. Another part of the compressed air is supplied to the high-temperature part of the turbine as cooling air via the cooling air system 9a.

In this case, particularly, in the part of the first boost compressor 7 driven by the turbine shaft, the second boost compressor 10 which is driven by the motor and operated when the turbine is started, is installed in parallel with the boost compressor 7. By the second boost compressor 10, even at start of the turbine, fuel oil spray air and high-temperature cooling air at sufficient pressure can be supplied.

Namely, when the reliability of cooling air supply is to be improved by using the boost compressor 7 driven by the turbine shaft for driving the boost compressor as long as the turbine shaft rotates, since at start of the turbine, the number of revolutions of the turbine shaft is low, the discharge force of the boost compressor is insufficient and air cannot be used as fuel oil spray air. However, in the aforementioned constitution, at start of the turbine, a start spray air system 11 having the boost compressor 10 driven by the motor is used and by doing this, a cooling air supply system having high reliability driven the turbine shaft is obtained and also even at start, fuel spray air can be obtained.

In this case, needless to say, after the turbine is started and increases in rotational speed up to the predetermined number of revolutions, the boost compressor 10 driven by the motor is stopped and unnecessary power is reduced.

Figure 2:
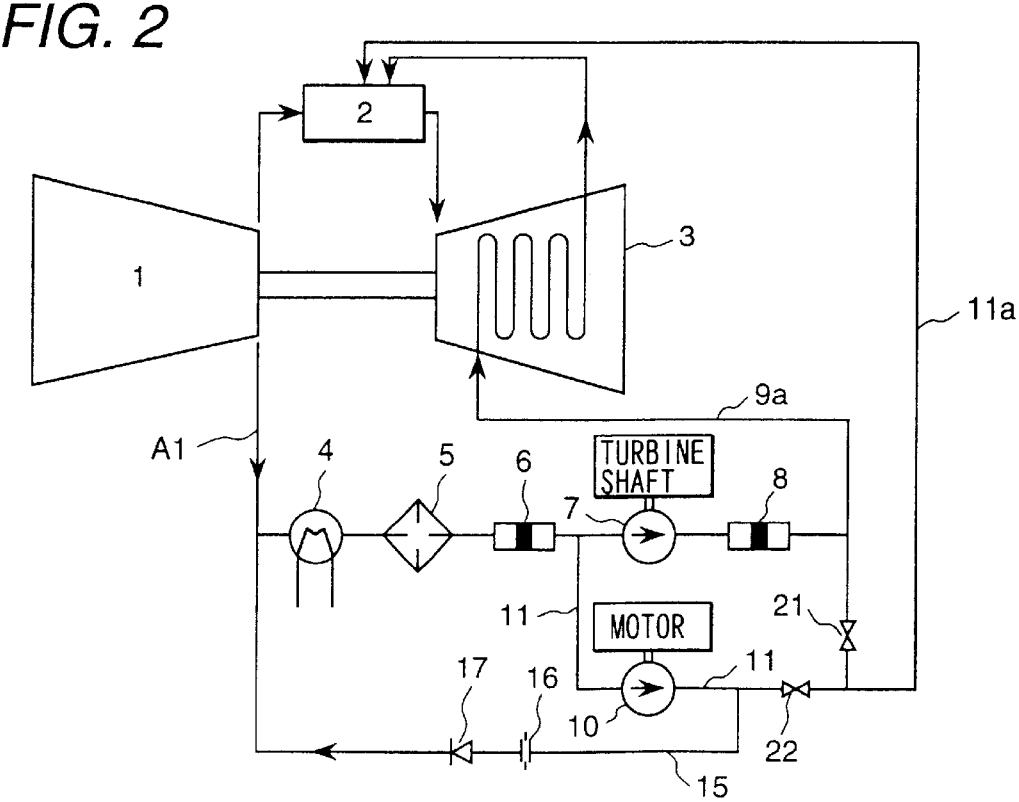
FIG. 2 is a schematic view showing another embodiment of a gas turbine of the present invention.

FIG. 2 shows the second embodiment of the present invention and in this case, for the boost compressors 7 and 10, valves 21 and 22 for switching the boost compressors 7 and 10 driven by the turbine shaft and motor respectively to be used are installed. By doing this, at start, the pressure at the outlet of the boost compressor 7 driven by the turbine shaft is monitored and when the discharge pressure becomes sufficiently high, the system can be switched from the boost compressor 10 driven by the motor for starting to the boost compressor 7 driven by the turbine shaft.

On the air outlet side of the start spray air system 11, a bypass system 15 is installed. In the bypass system 15, a check valve 17 for preventing the boost compressor 10 from damage due to back flow of air in the bypass system when the boost compressor 10 driven by the motor is stopped and an orifice 16 for reducing the pressure of the bypass system 15 are installed.

Figure 3:
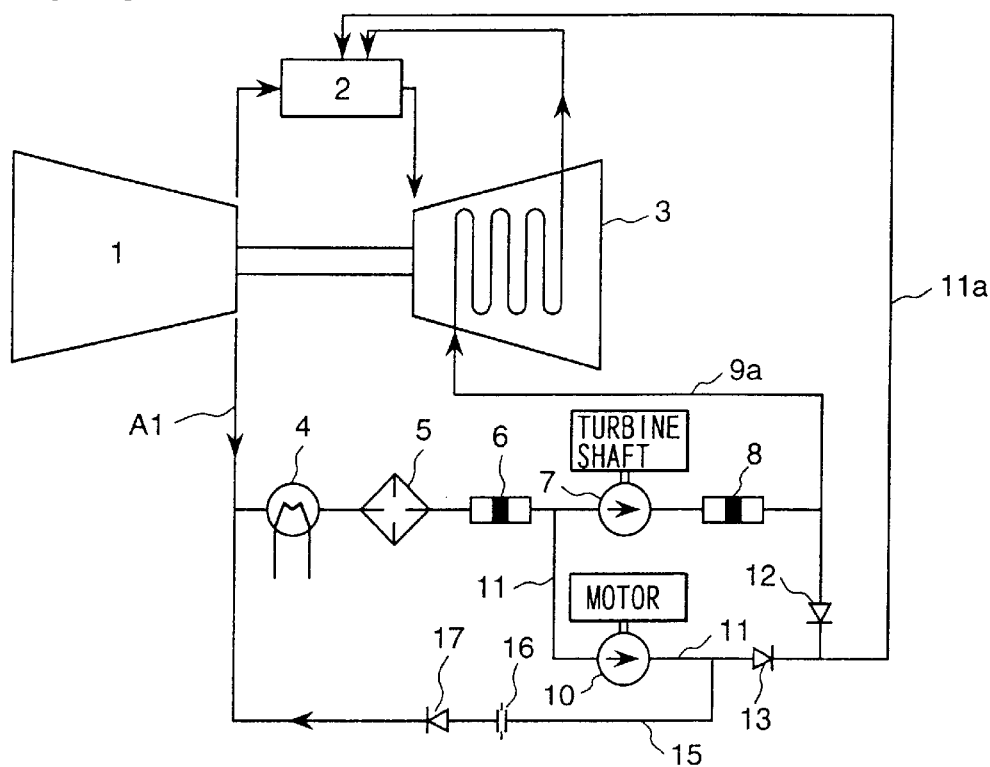
FIG. 3 is a schematic view showing another embodiment of a gas turbine of the present invention.

In FIG. 3, the third embodiment is shown. On the outlet sides of the boost compressors driven by the turbine shaft and motor, check valves 12 and 13 are installed, respectively. By doing this, when the turbine is started, fuel oil spray air is supplied to the combustor 2 by the boost compressor 10 driven by the motor, though as the number of revolutions of the turbine increases, the discharge pressure of the boost compressor 7 driven by the turbine shaft increases and becomes higher than the pressure of the boost compressor 10 driven the motor, so that by the balance in the discharge pressure between the boost compressor driven by the turbine shaft and the boost compressor driven the motor, the spray air supply system to the boost compressor 7 driven by the turbine shaft or to the combustor 2 is switched. Therefore, there is no need to install a control unit for switching the system and a highly reliable and simple spray air system can be obtained.

Figure 4:
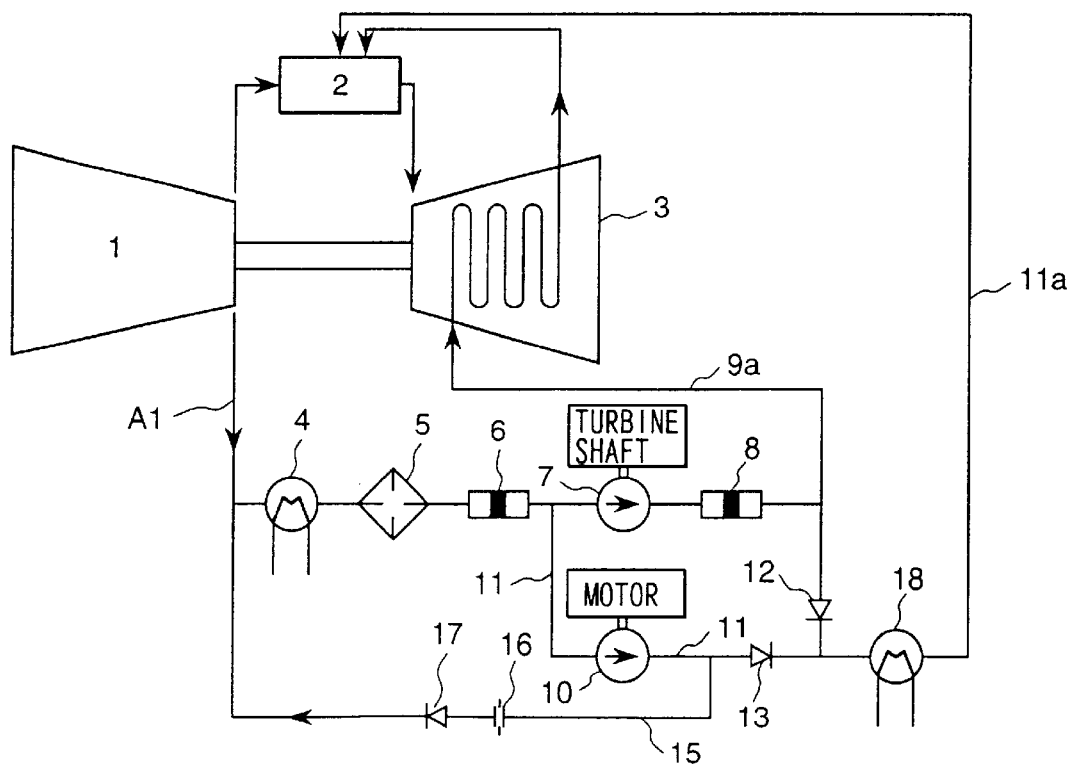
FIG. 4 is a schematic view showing another embodiment of a gas turbine of the present invention.

In the fourth embodiment, as shown in FIG. 4, a heat exchanger 18 is installed in the spray air system 11a for supplying air to the combustor 2. By doing this, even if there is a difference between the cooling air temperature required for cooling the high-temperature part of the turbine and the temperature required as fuel oil spray air, by lowering the temperature of fuel oil spray air and adjusting it to an appropriate temperature, carbonization of fuel oil due to exposure thereof to high-temperature air can be prevented.

Figure 5:
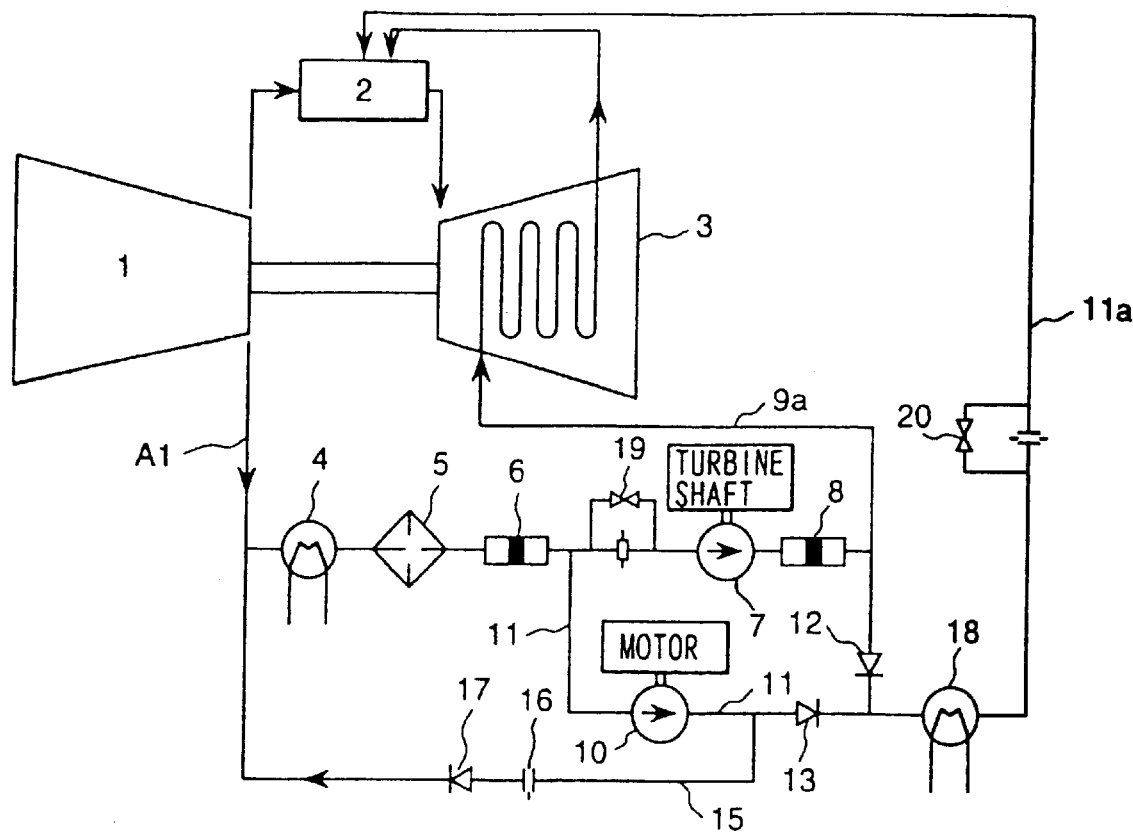
FIG. 5 is a schematic view showing another embodiment of a gas turbine of the present invention.

In the fifth embodiment, as shown in FIG. 5, a pressure adjustment valve 19 for adjusting the inlet pressure of the boost compressor 7 driven by the turbine shaft and a pressure adjustment valve 20 for adjusting the fuel oil spray air pressure are installed. In this case, in the respective pressure adjustment valves 19 and 20, bypass orifices for protection of the compressors in the closing operation that the valves are fully closed are installed in parallel. With this constitution, by monitoring each system pressure of cooling air and spray air and controlling the pressure adjustment valves, each pressure can be adjusted to each requested appropriate pressure.

When the turbine is started, fuel oil spray air is supplied to the combustor 2 by the boost compressor 10 driven by the motor. In this case, the check valve 12, since the discharge pressure of the boost compressor 10 driven by the motor is larger than the discharge pressure of the boost compressor 7 driven by the turbine shaft, is fully closed and discharged air of the boost compressor 7 driven by the turbine shaft is all supplied to the high-temperature part of the turbine as cooling air. The pressure of fuel oil spray air to be supplied to the combustor 2 is adjusted to appropriate pressure by the pressure adjustment valve 20. Surplus air from the boost compressor 10 driven by the motor, which is generated by reducing the opening of the pressure adjustment valve 20 passes through the bypass system 15, and is reduced in pressure by the orifice 16, and returned to the inlet of the heat exchanger 4.

When the discharge pressure of the boost compressor 7 driven by the turbine shaft increases as the turbine 3 speeds up, the check valve 13 is fully closed due to the balance of pressure, and discharge air of the boost compressor driven by the motor is all supplied to the bypass system 15. Thereby, fuel oil spray air is switched to discharge air of the boost compressor 7 driven by the turbine shaft. After the fuel oil spray air system is switched, the boost compressor 10 driven by the motor is stopped and unnecessary power is reduced.

With respect to cooling air of the high-temperature part of the turbine, the air temperature required for cooling air supply is considered to be higher than the optimum temperature as fuel oil spray air in consideration of thermal stress generated in the high-temperature parts of the turbine. As a result, discharge air of the boost compressor 7 driven by the turbine shaft is supplied to the heat exchanger 18 and lowered to an appropriate temperature, so that carbonization of fuel oil is prevented.

To adjust the flow rate of fuel oil spray air to be supplied to the combustor 2, fuel oil spray air is supplied to the combustor 2 via the pressure adjustment valve 20. In this case, from the viewpoint of reliability of the cooling air system, it is desirable that the pressure adjustment valve 20 is a valve which is generally enclosed totally, adjusted to necessary pressure via the orifice, supplies fuel oil spray oil to the combustor 2, and also when it breaks down, is totally enclosed.

According to this embodiment, when the turbine is started, the fuel air system for starting can be easily switched to the general spray air system.

As explained above, in a gas turbine formed like this, when turbine high-temperature part cooling air and fuel oil spray air are supplied using the boost compressor driven by the turbine shaft, at start, the boost compressor driven by the motor is driven and fuel oil spray air is supplied and hence even at start, high-pressure air appropriate to spray fuel oil can be supplied.

As explained above, according to the present invention, this kind of gas turbine which can sufficiently supply high-pressure air to the fuel oil spray air system and cooling air system even when it is started can be obtained.

What is claimed is:

1. A gas turbine having a turbine, a combustor fluidly connected to said turbine and producing combustion gas which drives said turbine, and a gas turbine compressor fluidly connected to said combustor and supplying compressed combustion air thereto, comprising:
    a heat exchanger fluidly connected to said gas turbine compressor which exchanges heat with a part of the air compressed by said gas turbine compressor;
    first and second boost compressors fluidly connected to said heat exchanger which compress the air heat-exchanged by said heat exchanger, said first and second boost compressors being arranged in parallel with each other in an air system, said second boost compressor being driven by a driving source other than a shaft of said turbine; and
    a spray air system which supplies the air compressed by said second boost compressor to said corubustor as air for spraying fuel.

2. A gas turbine according to claim 1, wherein said first boost compressor has an air system fluidly connected to said turbine which cools a high temperature portion of said turbine, and an air spray system fluidly connected to said combustor which supplies air as air for spraying fuel.

3. A gas turbine having a turbine, a combustor fluidly connected to said turbine and producing combustion gas which drives said turbine, and a gas turbine compressor fluidly connected to said combustor and supplying compressed combustion air thereto, comprising:
    a heat exchanger fluidly connected to said gas turbine compressor which exchanges heat with a part of the air compressed by said gas turbine compressor;
    first and second boost compressors fluidly connected to said heat exchanger which compress the air heat-exchanged by said heat exchanger, said first and second boost compressors being arranged in parallel with each other in an air system, said second boost compressor being driven by a driving source other than a shaft of said turbine; and
    a spray air system which supplies the air compressed by said second boost compressor to said combustor as air for spraying fuel during starting of said gas turbine.

4. A gas turbine having a turbine, a combustor fluidly connected to said turbine and producing combustion gas which drives said turbine, and a gas turbine compressor fluidly connected to said combustor and supplying compressed combustion air thereto, comprising:
    a heat exchanger fluidly connected to said gas turbine compressor which exchanges heat with a part of the air compressed by said gas turbine compressor;
    first and second boost compressors fluidly connected to said heat exchanger which compress the air heat-exchanged by said heat exchanger, said first and second boost compressors being arranged in parallel with each other in an air system, said second boost compressor being driven by a driving source other than a shaft of said turbine;
    a spray air system for supplying the air compressed by said second boost compressor to said combustor as air for spraying fuel; and
    a by-pass system which leads the air compressed by said second boost compressor to said heat exchanger.

5. An operation method of a gas turbine comprising a turbine, a combustor fluidly connected to said turbine and producing combustion gas which drives said turbine, a gas turbine compressor fluidly connected to said combustor and supplying compressed combustion air thereto, a heat exchanger fluidly connected to said heat exchanger which exchanges heat with a part of the air compressed by said gas turbine compressor, and first and second boost compressors fluidly connected to said gas turbine compressor which compress the air heat-exchanged by said heat exchanger, said first and second boost compressors being arranged in parallel with each other in an air system, wherein
    said second boost compressor is driven by a driving source other than a shaft of said turbine, and
    air compressed by said second boost compressor arranged in parallel is supplied to said combustor as air for spraying fuel.

6. An operation method of a gas turbine according to claim 5, wherein said first boost compressor has an air system fluidly connected to said turbine which cools a high temperature portion of said turbine, and an air spray system fluidly connected to said combustor which supplies air as air for spraying fuel.

7. An operation method of a gas turbine comprising a turbine, a combustor fluidly connected to said turbine and producing combustion gas which drives said turbine, a gas turbine compressor fluidly connected to said turbine and supplying compressed combustion air thereto, a heat exchanger fluidly connected to said turbine compressor which exchanges heat with a part of the air compressed by said gas turbine compressor, and first and second boost compressors fluidly connected to said heat exchanger which compress the air heat-exchanged by said heat exchanger, said first and second boost compressors being arranged in parallel with each other in an air system, wherein said first boost compressor is driven by a shaft of said turbine, said second boost compressor is driven by a driving source other than a shaft of said turbine during starting of said gas turbine, and air compressed by said first or second boost compressor arranged in parallel is supplied to a high temperature part of said turbine and recovered into said combustor, and supplied to said combustor as air for spraying fuel.

* * * * *